(12) United States Patent  (10) Patent No.: US 7,936,479 B2
Bracke et al.  (45) Date of Patent: May 3, 2011

(54) IMAGE PROCESSING METHOD FOR REDUCING IMAGING ARTIFACTS

(75) Inventors: Peter Bracke, Drongen (BE); Eddy Debaere, Deinze Asten (BE); Joris Van Garsse, Mullem (BE)

(73) Assignee: Agfa Graphics NV, Mortsel (BE)

( * ) Notice: Subject to any disclaimer, the term of this patent is extended or adjusted under 35 U.S.C. 154(b) by 667 days.

(21) Appl. No.: 11/921,723

(22) PCT Filed: Jun. 2, 2006

(86) PCT No.: PCT/EP2006/062855
§ 371 (c)(1),
(2), (4) Date: Dec. 5, 2007

(87) PCT Pub. No.: WO2006/131494
PCT Pub. Date: Dec. 14, 2006

(65) Prior Publication Data
US 2009/0051944 A1    Feb. 26, 2009

Related U.S. Application Data

(60) Provisional application No. 60/694,000, filed on Jun. 24, 2005.

(30) Foreign Application Priority Data

Jun. 10, 2005  (EP) ..................................... 05105112

(51) Int. Cl.
*H04N 1/60* (2006.01)
*G03F 3/08* (2006.01)
*G06K 9/00* (2006.01)

(52) U.S. Cl. ........................ 358/3.03; 358/518; 382/251

(58) Field of Classification Search ................. 358/3.03, 358/296, 298, 518; 382/251; 347/19, 14, 347/183, 106, 12, 15
See application file for complete search history.

(56) References Cited

U.S. PATENT DOCUMENTS

| 4,198,642 | A |   | 4/1980  | Gamblin |
| 4,967,203 | A |   | 10/1990 | Doan |
| 5,285,220 | A | * | 2/1994  | Suzuki et al. ................... 347/14 |
| 6,120,121 | A | * | 9/2000  | Tanaka ............................ 347/12 |
| 6,679,583 | B2 |  | 1/2004  | Vanhooydonck |
| 6,830,306 | B2 | * | 12/2004 | Couwenhoven et al. ....... 347/12 |
| 2002/0181987 | A1 | | 12/2002 | Kakutani |
| 2004/0117595 | A1 | |  6/2004 | Norris |

* cited by examiner

*Primary Examiner* — Charlotte M Baker
(74) *Attorney, Agent, or Firm* — Keating & Bennett, LLP

(57) ABSTRACT

An image processing method includes a step of converting halftoned pixels of an image to be printed represented at a first lower tonal resolution into pixels represented at a second higher tonal resolution. Image processing is used on the pixels having a higher tonal resolution to reduce image quality artifacts when the pixels are printed at the first lower tonal resolution. In a preferred embodiment, the image processing includes error diffusion of a sigma delta modulation.

9 Claims, 10 Drawing Sheets

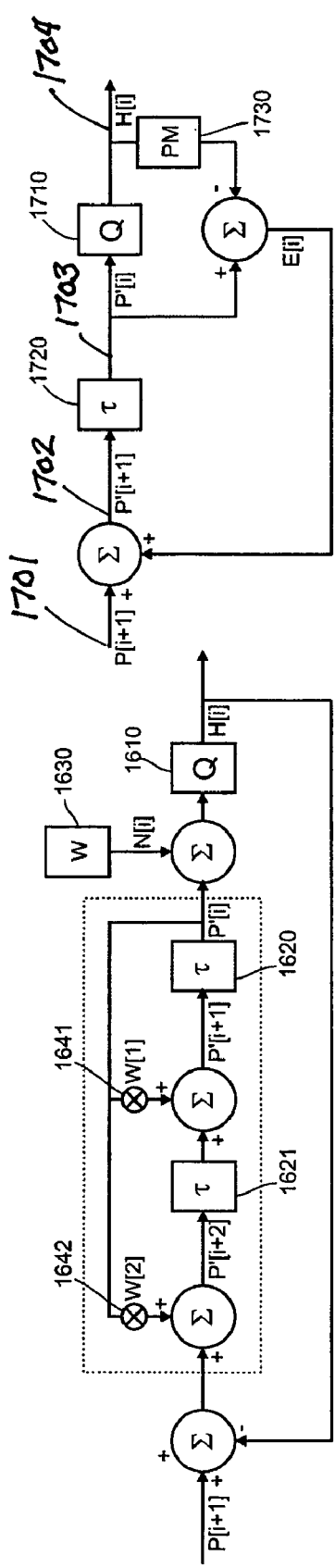
Figure 17
Figure 16
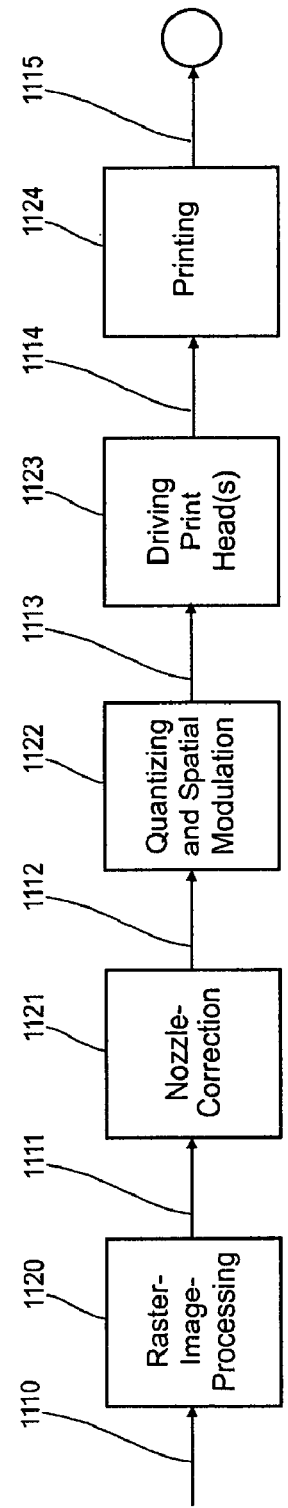
Figure 11

US 7,936,479 B2

IMAGE PROCESSING METHOD FOR REDUCING IMAGING ARTIFACTS

This application is a national stage filing under 35 USC §371 of PCT application no. PCT/EP2006/062855 filed on Jun. 2, 2006 and published as WO 2006/131494 A1. This application also claims priority to U.S. provisional patent application No. 60/694,000 filed on Jun. 24, 2005.

FIELD OF THE INVENTION

The present invention relates to an image processing method for reducing correlated image quality artifacts such as banding or streaking in dot matrix printers.

BACKGROUND OF THE INVENTION

Printing a digital document is one of the most efficient ways to convey information to a user. New print-on-demand technologies such as laser printing and inkjet printing enable to print documents almost instantaneously without the need for creating intermediate printing masters.

Inkjet printing works by jetting ink droplets through a nozzle onto a substrate.

In the case of continuous inkjet, a continuous stream of electrically charged ink droplets is produced and electromagnetic fields are used to guide this stream away from or towards a substrate as to form an image on said substrate.

In the case of drop-on-demand inkjet, a mechanical or thermal energy pulse is applied to ink residing in a small chamber in order to create a pressure wave that propels a miniscule ink droplet at high speed through the nozzle towards a substrate. The pressure wave is controlled by shaping the length and the profile of the electrical waveform that is applied to the thermal or mechanical transducer in the ink chamber. In many cases the volume of the droplet and the size of the ink spot are substantially fixed. In other cases, the volume of the droplet can be modulated to create ink spots having different sizes on the substrate.

Printing the image of a document is usually achieved by moving the nozzle relative to the substrate along a raster by means of a shuttle in combination with a substrate transport mechanism and selectively jetting ink droplets on a substrate in response to the image of said document.

When the ink droplets land on a substrate, they form ink spots. Because these ink spots are small, they cannot be individually resolved by the human visual system but together they render a visual impression of the image of the printed document. Generally a halftoning technique is used to determine the spatial distribution of ink spots that produces an optimal rendering of the image of a given document.

A well know halftoning technique is error diffusion and is explained in the book "Digital Halftoning" by Robert Ulichney, published by the MIT Press, Cambridge Mass. In this book, different variations of the error diffusion technique are presented that can be used to convert a two-dimensional image of pixels represented on a substantially continuous tone scale into a halftoned image of pixels that can take only two tone values corresponding with an ink spot or no ink spot. Many other variations on the error diffusion technique have been described, including multilevel error diffusion techniques to drive printing devices capable to render more than two tone values, vector error diffusion to render color images and error diffusion techniques that produce a more homogeneous distribution of halftone dots in the highlight regions of an image.

To increase printing speed usually not one but an array of nbrNozzles inkjet nozzles are generally used that can be operated in parallel. Such an array of nozzles makes up a print head.

By moving a shuttle comprising a print head across the substrate in a fast scan orientation, a set of parallel raster lines of pixels can be printed in one step. Such a set of raster lines is called a swath.

When a swath has been printed, the print head is moved in a slow scan direction over a distance of the length of the array of nozzles to print an additional swath of lines underneath said previous swath. This process of printing swaths is repeated until a complete document is printed on the substrate.

The smallest value for the nozzle pitch is practically limited by constraints imposed by the manufacturing process. For reasons of image quality, however, a printing pitch in the slow scan direction is often desired that is smaller than the nozzle pitch. The document U.S. Pat. No. 4,198,642 teaches that a value can be selected for the printing pitch in the slow scan orientation that is an integer fraction 1/n of the nozzle pitch by using an interlacing technique.

Because of manufacturing tolerances, systematic variations between nozzles belonging to the same inkjet head exist of the volume of droplets and of both their ejection velocity and direction. If all the ink droplets of a single line of pixels in the fast-scan orientation are printed by the same nozzle, the variations in the ejection direction across the slow-scan orientation show up as correlated image artifacts that look like banding or streaking.

The document U.S. Pat. No. 4,967,203 introduces a technique to resolve this problem. By having the pixels on one and the same line printed by different nozzles instead of by the same nozzle, the correlated image quality artifacts can be de-correlated. The underlying assumption is that the image quality artifacts caused by variations between different nozzles are uncorrelated. De-correlating the image quality artifacts diffuses them over the printed substrate so that they become less perceptible or preferably imperceptible. In many documents, this technique is referred to as shingling. The method presented in U.S. Pat. No. 4,967,203 reduces printing speed, because multiple passes of the print head are required to print all the pixels on a line.

In U.S. Pat. No. 6,679,583 an improved technique is presented that combines the effects of the teachings in U.S. Pat. No. 4,198,642 and U.S. Pat. No. 4,967,203 and adds a number of other improvements, including improved printing speed. In this document, the term mutually interstitial printing is introduced to describe both interlacing and shingling. The term mutually interstitial printing also avoids confusion, as the term shingling is preferably used in the graphic arts industry to describe a technique that compensates for the effects of the thickness of the paper on the width of the margin in saddle-stitched bookmaking.

Once an ink droplet ejected by a nozzle lands on a substrate, it is being cured so that it receives the required resistance against rubbing. Ink curing can be achieved by a number of mechanisms.

A first mechanism of ink curing is absorption of the ink into fibers of the substrate or a porous coating. This is the dominant mechanism when oil or water based inks are used.

A second mechanism of ink curing is coagulation of the ink by evaporation of an ink solvent. When the ink solvent has evaporated, pigments or dyes together with a binder material are left on the paper.

In many practical applications, a combination of the two above effects takes place: ink is initially absorbed by a substrate and then, depending on the vapor pressure of the solvent, evaporates in a shorter or longer time.

A third mechanism of ink curing is polymerization, for example under the influence of an external energy source such as a UV light source. The high-energy radiation creates free radicals that initiate a polymerization reaction that solidifies the ink. The main advantage of this technique is that it enables the printing on media that do not absorb ink.

A fourth mechanism of ink curing is phase or viscosity change by temperature. Ink is jetted at a high temperature when it is in liquid phase, and solidifies when it cools down on the printed surface.

Especially in industrial print applications, such a poster printing, textile printing, decoration printing, packaging printing etc, there is a demand to print large areas in a short time.

A first approach to meet this demand is to increase the number of nozzles of a print head. Printing with more nozzles in parallel directly increases printing performance. The company XAAR plc., located in Cambridge UK, has demonstrated print heads with a length of 30.5 cm (12 inches) that print with 142 nozzles per cm (360 nozzles per inch). However, because the chance that a head contains a nozzle that is defective during production or that becomes defective during use increases more than proportionally with the length of the head, the production yield and reliability of such long heads tends to be low. This results in high manufacturing and maintenance costs. Another problem is that for certain applications even longer heads are needed. Besides that this would drive manufacturing and maintenance costs even further up, no tooling equipment actually exists for manufacturing such heads.

A second approach to increase the number of nozzles that can print in parallel and that was successfully taken by the company Agfa Dotrix N.V. located in Ghent Belgium, was to use an assembly of a plurality of smaller print heads. By mounting the heads on a print head mount, a print head assembly is obtained that has at least the same width or length as a document that has to be printed. This implies that such a document can be printed in one single swath.

The above approach is extremely effective for maximizing printing performance, not only because of the high degree of parallel printing by multiple nozzles but also because it makes the movement of a print head along slow scan orientation obsolete. It also addresses the problem of reliability and manufacturing and maintenance costs associated with the use of long print heads. However, it does introduce a number of other problems.

It was mentioned already that systematic variations between nozzles belonging to the same or different inkjet heads exist of the volume of droplets and of both their ejection velocity and direction. The causes of these variations are divers, but all come down to the effects of tolerances in different steps of the manufacturing such as the nozzle plate etching, the shaping and the mounting of the piezoelectric component and the back-to-back mounting of two print head in a sub-assembly.

One effect is that the diameter and shape of the nozzles on the nozzle plate may vary. A second effect is that the efficiency of the actuators in the ink chambers of different nozzles may vary, for example because of uneven stress on the piezoelectric material of the transducer or because of a non-uniform force sensitivity of the piezoelectric material. A third effect is that the glue layer thickness between the piezoelectric material and the other materials of the ink chamber may vary.

In conventional ink jet systems, the effects of these variations on image quality are managed by using mutual interstitial printing. Mutual interstitial printing relies on the printing the pixels on one single line in several passes and by different nozzles. This approach, however, is not compatible with concept of single pass printing in the above system.

A possible solution to correct for uneven droplet volume would be to adjust the individual voltages that drive the actuators. This, unfortunately, is currently not possible since existing driver electronics of a print head simply do not offer this option.

A second solution would be to make a profile of the density variations in an image and to correct for these variations in the image of the document that is to be printed prior to the halftoning step. A disadvantage of this approach is that the corrected image cannot be repurposed since it is suitable for printing only on the device and specifically at the position on the device for which it was corrected.

A third solution would be to introduce a certain amount of noise to the image pixel values prior or past the halftoning step. Introducing noise can be an effective manner to mask correlated image artifacts that result from uneven droplet volumes. A disadvantage of this method, however, is that it tends to make the printed result grainy, which is undesirable from an image quality viewpoint.

The document US2002/0181987 describes an image processing method and a printing control system for an inkjet printer. The system accepts a color image, typically represented in an RGB color space, and first performs a spatial resolution conversion step to obtain a color image represented at the spatial resolution of the printing system [0085]. In a following step, every pixel in the color image is separated into a pixel represented in a colorant space, for example a cyan, magenta, yellow and black colorant space [0086]. A next step consists of separating for every pixel the magnitude of every colorant into a mixture of magnitudes corresponding to the droplet volumes that the printer can physically render. This step produces for every pixel and for every droplet volume of every colorant a magnitude represented on a near continuous scale [0088]. A final step consists of halftoning said near continuous magnitudes into a spatial distribution of binary dots for every droplet volume of every colorant. This step yields a printable binary image for every droplet volume that can be rendered with every color on said inkjet printer [0095]. The above referenced document also teaches an additional image processing step after the halftoning in which combinations of dots having droplet volumes on a given pixel location are replaced by alternate combinations of dots having different droplet volumes[0104]. According to above referenced document, the image processing for all the pixels in the image is the same. This makes the method unsuitable for correcting correlated image artifacts that result from systematic variations between nozzles.

The document US2004/00117595 teaches an example of what is known to a person skilled in the art as "color vector error diffusion". Referring to FIG. 6 in this document, a module 205 quantizes an error corrected color vector. An error calculator 206 calculates the difference between the error corrected color vector before and after quantization, and sends the result to an error diffuser 307. The error diffuser adds a portion of the error back to the next uncorrected color vector to obtain a new error corrected color vector. According to above referenced document, the image processing for all the pixels in the image is the same. This makes the method unsuitable for correcting correlated image artifacts that result from systematic variations between nozzles.

This means that an alternative approach is needed to suppress the image quality artifacts, such as banding or streaking, that result from systematic variations between nozzles belonging to the same or different print heads that are part of a print head assembly. Preferably, the alternative approach does not require processing of the image of a document that is to be printed prior to halftoning and does not require controlling the individual voltages that drive the transducers of nozzles belonging to the same or a different print head.

SUMMARY OF THE INVENTION

The above objects are realized by a method that comprises the steps of calculating a first halftoned image, converting said halftoned image into a high tonal resolution image, compensating said high tonal resolution image, and using an error diffusion technique to halftone said compensated image into a second halftoned image.

Since said first halftoned image does not contain corrections for correlated image quality artifacts that are specific for a given printing device, said first halftoned image can be repurposed for use on other printing devices or for printing said image or for printing on any position on a printing device. Since the method is based on image processing, no adjustment of the driver voltages is required. Furthermore, the method minimizes the introduction of additional graininess in the printed result. Further embodiments and further advantages are set out in the independent and dependent claims, and in the full description of the invention.

BRIEF DESCRIPTION OF THE DRAWINGS

FIG. 11 shows an image processing method according to a preferred embodiment of the current invention.

FIG. 16 shows a scheme representing a sigma-delta modulator having two weights.

FIG. 17 shows an error diffusion method comprising a printer model.

DETAILED DESCRIPTION OF THE INVENTION

Printing

The method according to the current invention is directed towards the use in inkjet printers and specifically drop-on-demand inkjet printers. The term printing as used in the invention refers to the process of creating a structured pattern of ink markings on a substrate.

Ink

The ink could be a conventional pigmented or dyed ink or colorant, but it could also be wax, a water repellent substance, an adhesive or a plastic. Typically, ink is not a pure compound, but a complex mixture comprising several components such as dyes, pigments, surfactants, binders, fillers, solvents, water and dispersants, each component serving a specific function. The ink could also be a material of which the viscosity or phase changes with temperature, such as wax. Specifically mentioned also are inks that polymerize, for example under influence of electromagnetic radiation such as UV light. This process is called UV curing.

Substrate

The substrate could be paper, but it could also be textile, a synthetic foil or a metal plate or any other printable substrate as known in the art. Examples includes the use of inkjet printing (drop-on-demand and continuous) to create printing masters for offset printing, to print on packages in cardboard or plastic, to print decorative images. The unprinted substrate can be available either on roll or as a pile of separate, usually rectangular sheets. The substrate is characterized by a width called substrate width. When the substrate is on roll, this width corresponds with the width of the roll. When the substrate is available as a rectangular sheet, this width corresponds with one of the two dimensions of said rectangular sheet, for example the shortest dimension of said sheet.

Description of the Apparatus

Single Print Head

Figure 1:
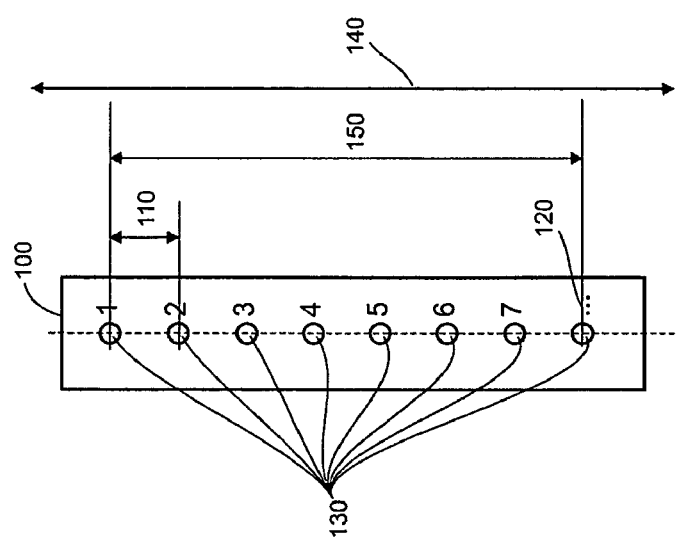
FIG. 1 shows a print head of a dot matrix printer.

Referring to an embodiment shown in FIG. 1, an array of transducers, ink chambers and nozzles 130—etched in a nozzle plate—together make up a print head 100. The inkjet nozzles 130 can be operated in parallel and produce droplets with a fixed or a variable volume.

Variable Droplet Volume

Figure 2:
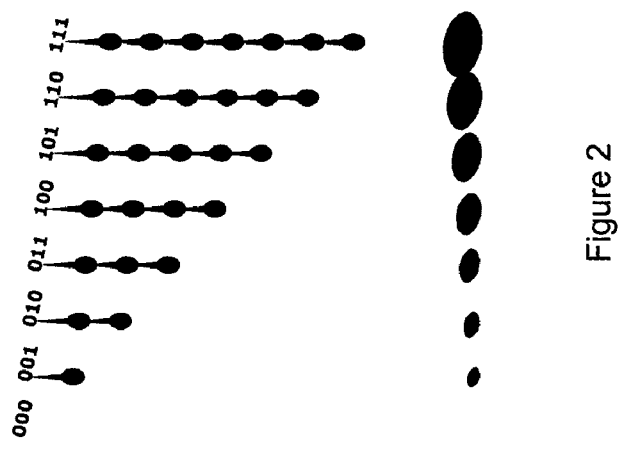
FIG. 2 shows ink droplets having a variable size that are formed by a sequence of a variable number of micro-droplets.

According to one embodiment, the volume of a droplet is modulated by means of a variable number of micro-droplets. FIG. 2 shows a case that the number of micro-droplets can vary between 0 and 7. Because the micro-droplets are so tiny, the air friction subjects them to substantial deceleration, and as a result, the micro-droplets coagulate into one single droplet having a variable volume by the time it lands on the printable substrate. The volume of these droplets is referred to by the number of micro-droplets of which said droplet consists. More specifically in the example shown in FIG. 2, the volume of a droplet having a variable size is referred to by an integer number ranging from 0 to 7 (represented by binary numbers in FIG. 2).

Different droplet volumes when printed result in different sizes of ink spots and different measured densities on the printed substrate.

In what follows, the tone resolution of a printing device shall refer to the number of density values that can be printed by a given device at a pixel position with a single ink.

Printing Device

Figure 3:
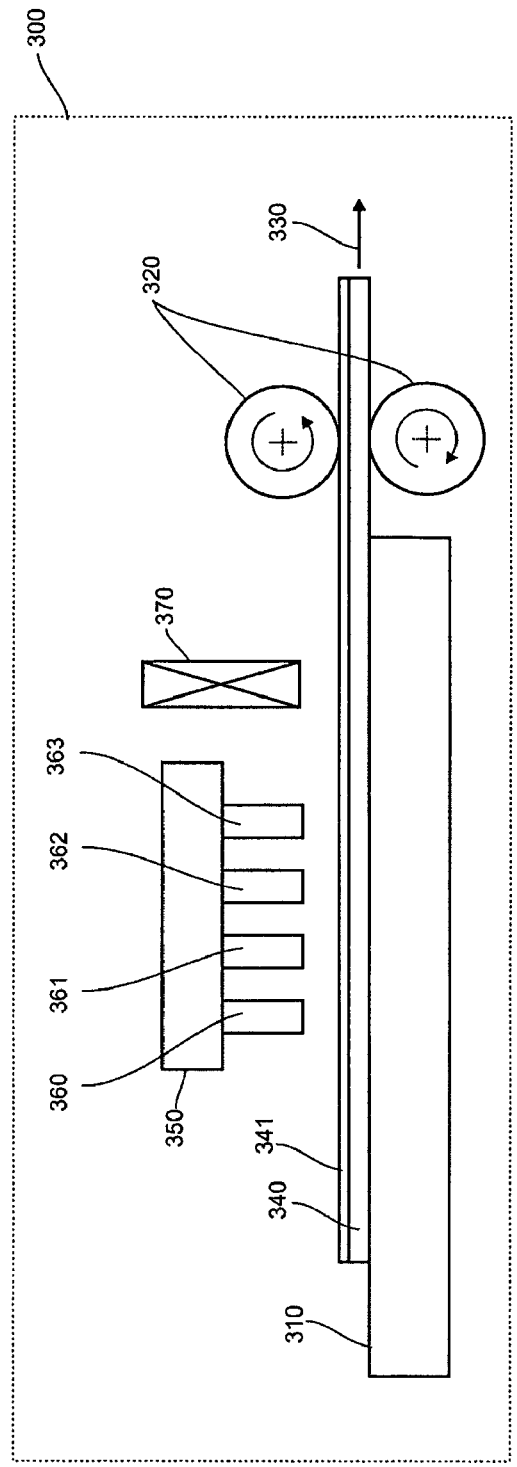
FIG. 3 shows an inkjet printer according to an embodiment of the current invention.

According to a preferred embodiment and referring to FIG. 3, printing an image of a document using a printer 300 is achieved by moving a substrate 340 having an ink-receiving layer 341 relative to a print head by means of a substrate transport mechanism and selectively jetting ink droplets on said substrate in response to said image of said document.

In FIG. 3, the substrate 340 rests on a substrate support 310. The substrate transport mechanism comprises two rollers 320, of which at least one is driven by a substrate transport motor (not shown in FIG. 3).

FIG. 3 shows not one but multiple printing heads. In one embodiment four print heads (360, 361, 362, 363) are used that print with cyan, magenta, yellow and black ink. These heads are mounted on a print head support (350). Not shown on FIG. 3 are the ink reservoirs and the tubes that are necessary for operating the printing device.

In one embodiment, the inks spots on the substrate that result from droplets jetted by different heads are allowed to physically mix before they are cured. This technique of jetting subsequent droplets without intermediate curing is referred to as wet-on-wet printing.

FIG. 3 also shows a curing station 370 for curing the printed inks after they have been printed on the substrate. In one embodiment, the curing station is a UV source that radiates energy having a spectrum that causes curing of the ink.

Slow and Fast Scan Orientation and Direction

Referring to FIG. 3, the orientation that corresponds with the movement of substrate relative to the print head is called the fast scan orientation. The direction 330 in which the substrate moves relative to the print head shall be called the fast scan direction.

The orientation perpendicular the fast scan orientation is called the slow scan orientation. According to a preferred embodiment and referring to FIG. 3, the orientation of an array of nozzles belonging to a print head is parallel to the slow scan orientation.

The positions on the substrate where a droplet can be printed form an addressable grid of pixels. By convention, we refer to sets of pixels on the addressable grid that are aligned with a fast scan orientation rows of pixels and sets of pixels that are aligned with a slow scan orientation columns of pixels.

Array of Nozzles

Referring to FIG. 1, each nozzle of a print head can be indexed by means of a nozzle index nozzleIndex that ranges from 1 to nbrNozzles. The shortest distance between two nozzles 130 along the slow scan orientation 140 is called the nozzle pitch 110 and is indicated by the variable nozzlePitch. The length 150 of a nozzle array can be expressed as a multiple of the length of slowScanPitch and is indicated by a variable headSize.

A set of pixels that can be addressed by the nozzles of a print head during one movement along the fast scan orientation is called a swath. The size of a swath is measured in an orientation parallel to the slow scan orientation is called swathSize. According to a preferred embodiment, the swath size is equal to or larger than the image of a document so that all the pixels of said document can be printed in one swath.

Figure 4:
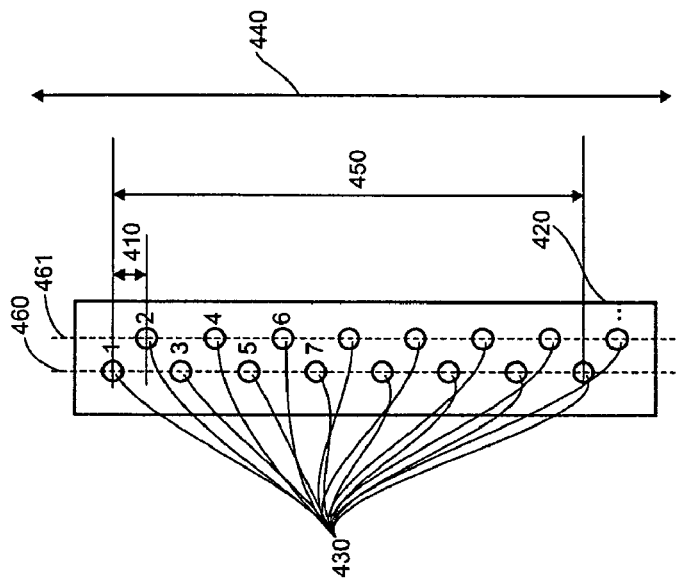
FIG. 4 shows a print head having two columns of nozzles in a staggered position.

Referring to FIG. 4, the nozzles 430 of an array may be staggered for constructive reasons along two or more rows (460, 461). In that case, the nozzle pitch 410 is defined as the shortest distance between two lines perpendicular to the slow scan orientation and going through the centers of the staggered nozzles.

If a print head contains staggered arrays of nozzles, the timing of the firing of droplets from nozzles belonging to different rows is preferably adjusted so that the pixels belonging to a same line parallel to the slow scan orientation in the image of a document also land on the same line parallel to the slow scan orientation on the printed image. By adjusting the timing this way, the processing to prepare the signals for the nozzles can be the same as if all the nozzles were virtually on the same line.

Figure 5:
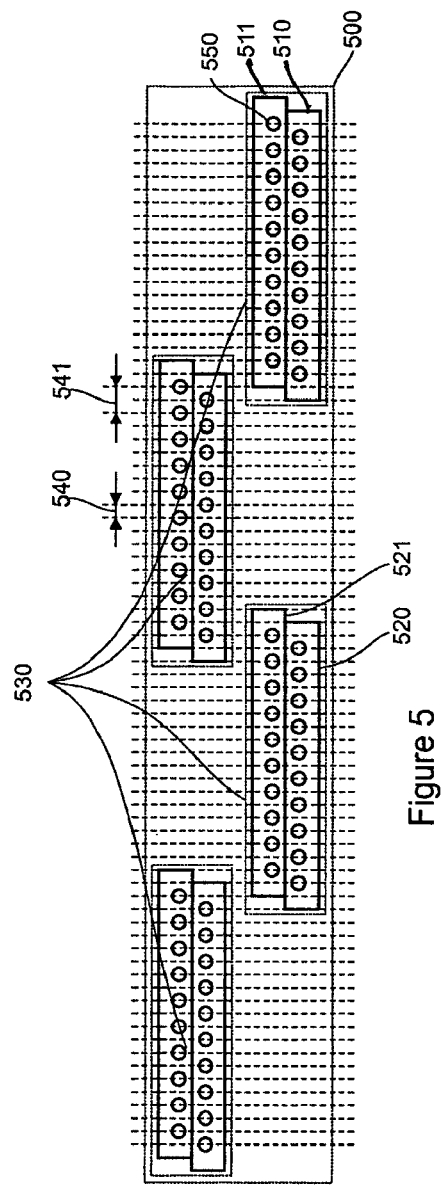
FIG. 5 shows a print head assembly according to an embodiment of the current invention.

According to a preferred embodiment of the current invention, not one head is used but a sub-assembly of two heads that are mounted back to back. Each individual print head comprises one row of 318 nozzles having a nozzle pitch of 169 micrometer, which corresponds to 59.2 nozzles per cm or 150.3 nozzles per inch. The transducers in the print heads are of the electromechanical type and are built using piezoelectric materials. Referring to FIG. 5, by displacing a second head 520 over exactly half a nozzle pitch 541 with regard to a first head 521, a sub-assembly 530 is obtained that can print at double the resolution of the original heads. So the sub-assembly is effectively equivalent to a single print head having two rows of 318 nozzles and having a nozzle pitch of 84.5 micrometer, which corresponds to 118.4 nozzles per cm or 300.6 nozzle per inch.

According to said same preferred embodiment and referring to FIG. 5, the swath size is increased by mounting a plurality of sub-assemblies 530 of print heads in a staggered fashion to form a print head assembly 500. The sub-assemblies 530 may or may not have overlapping nozzles. The timing of the firing of droplets from nozzles belonging to different print head sub-assemblies is preferably adjusted so that the pixels belonging to a same line parallel to the slow scan orientation in the image of a document also land on the same line parallel to the slow scan orientation on the printed image. By adjusting the timing this way, the processing to prepare the signals for the nozzles can be the same as if all the nozzles were virtually on the same line.

According to said preferred embodiment, a set of four print head assemblies are used that print with different inks, such as with cyan, magenta, yellow and black inks.

Also according to said preferred embodiment, the nozzles belonging to a different print head assembly are lined up along the fast scan orientation so that nozzles belonging to different head assembly but having the same nozzle index print on the same raster line during the same swath.

A relation exists between the print resolution slowScanResolution along a slow scan orientation and the nozzle pitch. More specifically $$slowScanResolution = 1/nozzlePitch.$$

For a constant speed represented by the variable fastScanVelocity of the substrate relative to a print head or print head assembly, the printing resolution in the fast scan orientation represented by a variable fastScanResolution is proportional with the firing frequency of the nozzles represented by a variable firingFrequency, i.e. the time rate at which ink droplets can be ejected by a nozzle. Hence the fast scan resolution fastScanResolution is dictated by the ratio of the firing frequency firingFrequency divided by the velocity fastScanVelocity in the fast scan direction:

fastScanResolution=FiringFrequency/fastScanVelocity

A higher spatial resolution enables the rendering of finer image details and hence generally enables to achieve a higher image quality.

Computer System

Figure 6:
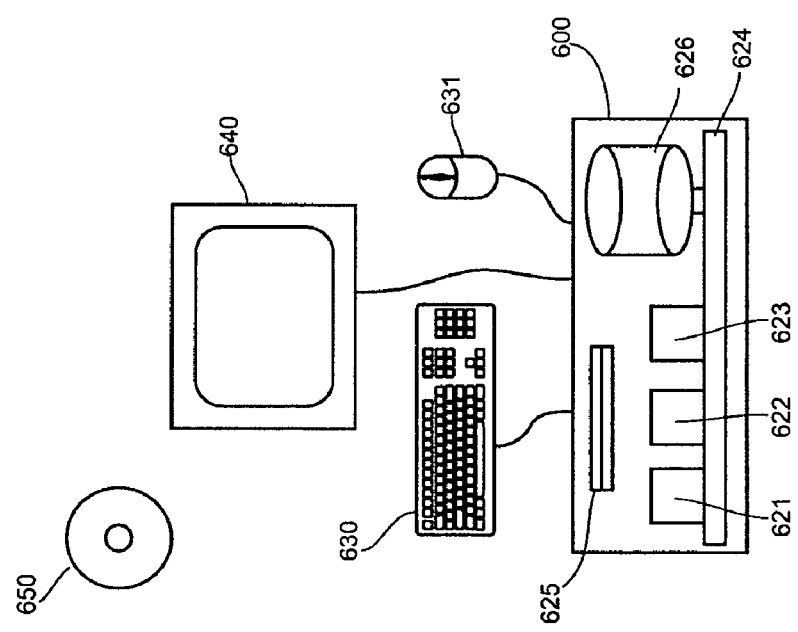
FIG. 6 shows a data processing system that is part of an embodiment according to the current invention for generating printer commands.

According to a preferred embodiment and referring to FIG. 6, printer commands are generated from a data processing system 600 such as a computer. The data processing system (600) comprises a network connection means (621), a central processing unit (622) and memory means (623) which are all connected through a computer bus (624). The data processing system 600 typically also has a computer human interface (630, 631) for inputting data and a computer human interface (640) for outputting data. According to one embodiment, the computer program code is stored on a computer readable medium such as a mass storage device (626) or a portable data carrier (650) which is read by means of a portable data carrier reading means (625).

Printer Controller

Figure 7:
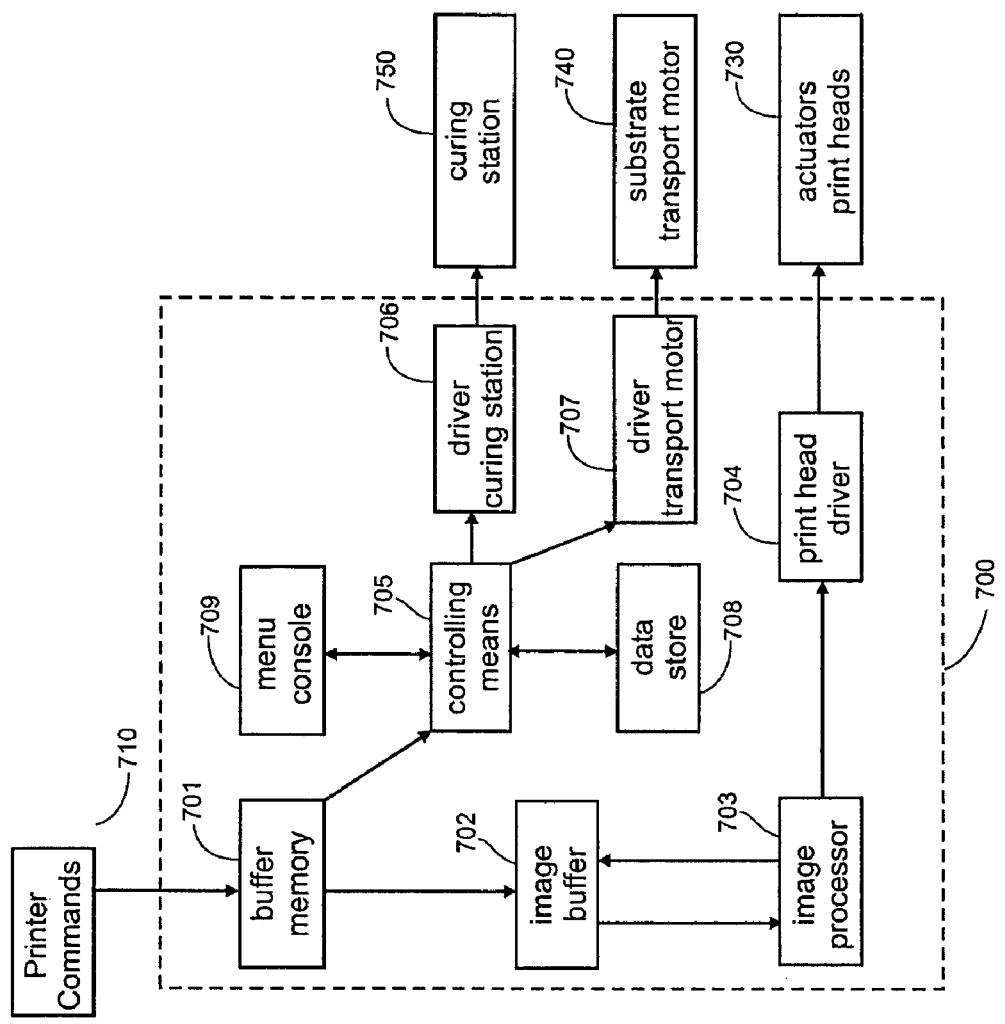
FIG. 7 shows a printer controller that is part of an embodiment according to the current invention for controlling a printer.

Referring to FIG. 7, a substrate transport motor 740, a curing station 750 and actuators of print heads 730 are controlled by a printer controller 700. Printer commands 710 are received by a buffer memory 701. These printer commands contain controller information, which is sent to controlling means 705 and image data that is sent to an image buffer 702. An image processor 703 can operate on the image data in the image buffer 702. The controlling means 705 controls a substrate transport driver 707 that drives said substrate transport motor 740. The controlling means 705 also controls a curing station driver 706 that drives a curing station 750. The information in the image buffer 702 can be used to drive the actuators of the print heads 730 by means of a print head driver 704.

Description of the Method

An example of a procedure according to the current invention comprises the steps of printing a profile image, measuring and analyzing said profile image, calculating correction table for each nozzle, and processing an image using said correction tables. These steps will now be explained in detail.

Printing a Profile Image

A first step comprises printing a profile image. The purpose of printing said profile image is to collect the information that is needed to correct for the systematic density variations that originate from systematic variations in droplet volume along the slow scan orientation of a print head or a print head assembly.

This is achieved by setting the drivers of the print head at a fixed pre-set driver level and printing a profile image. The density variations across the slow scan orientation in such a profile image will reflect the systematic variations that exist between the droplet volume produced by different nozzles belonging to the same or a different print head.

In one of the embodiments that has been earlier described, a print head is used that can render 8 droplet volumes {0, 1, 2, 3, 4, 5, 6, 7}. In one embodiment, a profile image is printed for every droplet volume larger than zero. It was found in experiments, however, that the relation between variations in droplet volume and print density is approximately linear. From this follows that it may be sufficient to print only one profile image, for example using a droplet volume associated with level 4, and to extrapolate the density variations that are obtained this way to other droplet volumes.

According to a preferred embodiment, at least one profile image is printed for every print head or print head assembly. For example, if four print heads or print head assemblies are used to print with cyan, magenta, yellow and black ink, a separate profile image is printed with each of these print heads or print head assemblies.

According to one of the preferred embodiments, the profile image is split into two profile sub-images prior to printing. In a first profile sub-image, the nozzles with an odd index number are activated to print, while the nozzles having an even nozzle index do not print. In a second profile sub-image, the nozzles with an even index number are activated to print, while the nozzles having an odd nozzle index do not print. The result is that each printed profile sub-image now contains a set of lines parallel to the fast scan orientation that are associated with individual nozzles with white space parallel to the fast scan orientation in between them. Having these white spaces enables to better characterize individual nozzles. A disadvantage, however, is that density variations that result from dot placement variations along the slow scan orientation are not modeled using this technique.

According to another preferred embodiment, the principles of the two previous embodiments are combined. A first step comprises printing a profile image with a print head or a print head assembly with all the nozzles activated. This step is particularly suited to model the density variations caused by dot placement deviations. A second step comprises printing a profile image using only the nozzles that have an odd index number. A third step comprises printing a profile image using only the nozzles that have an even index number. The second and the third step are particularly suited to model dot size variations.

Scanning Profile Image

In a next step, a profile image is scanned using a high-resolution scanner. For example, if the distance between two printed lines is 1/59.2 cm (1/150.3 inch) as in the prior embodiments, the profile image could be scanned at 787.4 pixels per cm (or 2000 pixels per inch). The scanned profile image results in a digital raster image file containing pixels having intensity values.

Scanning a profile image is preferably done using a color scanner having red, green and blue spectral filters.

In one embodiment, the intensity values of the pixels in said digital raster file are the addition of the responses of the red, green and blue spectral filters in said high-resolution scanner.

In another embodiment, only one spectral response is used that depends on the color of the ink of the profile image. For example, the spectral response through the blue filter is used for measuring a profile image printed with yellow ink, the spectral response through the red filter is used for measuring a profile image printed with cyan ink, the spectral response through the green filter is used for measuring a profile image printed with magenta or black ink.

Segmentation of the Profile Image

In a next step, image processing is used to identify a rectangular area in the digital raster image that corresponds to the ink stroke in the profile image area that is printed by a specific nozzle. This step is repeated for all the printing nozzles that belong to a print head or a print head assembly.

In the case that white spaces separate the ink strokes printed by different nozzles in a profile sub-image, this is easily achieved using one of the segmentation techniques as they are known in the field of digital image processing. An alternative technique consists of mapping the spatial geometry of the print head or print head assembly to identify the areas that are printed by different nozzles.

Averaging Pixel Values

According to a next step, the average value is calculated of the intensity values of the pixels that belong to an area that corresponds with a single nozzle. This averaging process reduces stochastic deviations between the pixel values that may result for example from noise in the scanning process or the grain of the substrate on which the profile image is printed.

Transformation to Density

According to a preferred embodiment, the average values that are obtained in the previous step for every nozzle of a print head or print head assembly are transformed into values that represent densities. A density value D of an intensity value I is obtained by taking minus the logarithm of said intensity value I value after it has been divided by a reference intensity value I0:

I is the average intensity of the pixel values that was obtained from the previous step. I0 could, for example, be the response of the scanner corresponding to unprinted substrate.

Other transformations than the transformation from intensity to density are also possible. For example, a transformation from intensity to a coordinate space that is based on the CIELab color space is also possible.

Preferably, a transformation is used that results in a substantially linear relationship between the droplet volume and the transformed intensity value.

Figure 8:
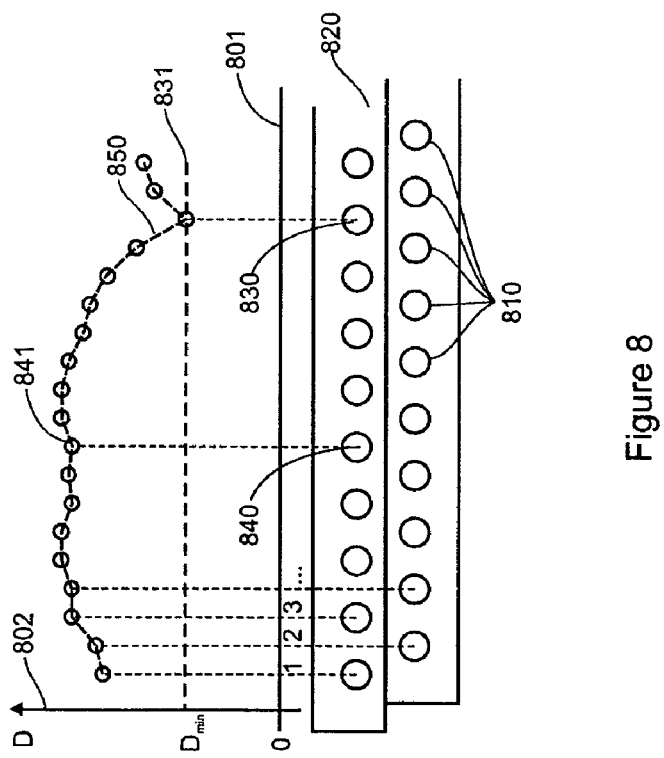
FIG. 8 shows a printer profile according to an embodiment of the current invention.

The result of the previous steps is a printer profile 850 that, for example looks like in FIG. 8. The abscissa 801 indicates the index of the nozzles 810, while the coordinate 802 represents a density value 841 corresponding to a nozzle 840 and as obtained from the previous steps.

The printer profile 850 shown in FIG. 8 is representative for the nozzles of one head 820 and for one selected droplet volume in combination with one substrate. A similar profile exists for the nozzles of a print head assembly comprising multiple print heads and for different droplet volumes. Similar profiles exist also for different multiple print heads or print head assemblies, as for example in the case of color printing. A set of printer profiles 850 that is obtained using the previous steps is typically valid for one kind of substrate or a limited range of substrates. If a substrate is used that has substantially different printing characteristics, a new set of print profiles is usually made by repeating the previous steps in combination with said substrate having different printing characteristics.

According to one preferred embodiment, a printer profile 850 is calculated based on multiple profile images. For example a first profile image could be printed with all the nozzles activated, a second profile image with only the nozzles having an odd index number activated and a third profile image with only the nozzles having an even index number activated. These three profile images result in three printer profiles. According to a preferred embodiment these three profiles are combined to obtain one global printer profile. For example, the data from a first printer profile obtained from said first profile image can be used to apply an additional correction on a second and third printer profile obtained from said second and third profile image—or vice versa.

Calculating Correction Factors

The printer profile 850 in FIG. 8 indicates that certain nozzles, e.g. 850, having an index [i] print with a higher density D[i], e.g. 841, than other nozzles, e.g. 830. This profile 850 shall be used as a basis for a nozzle correction method that will equalize the density response of all nozzles belonging to a print head or a print head assembly.

Because a nozzle 830 that prints with a lower density 831 cannot be corrected in a way to print with a higher density 841 at the same driving level, the purpose of a nozzle correction method shall be to reduce the average density 841 printed by those nozzles 840 that naturally print with a higher density 841.

Therefore, a reference nozzle with index 830 is identified in the printer profile that prints with a lowest density 831 having a value Dmin.

Based on this minimum density Dmin and on the density D[i], a correction factor NCF[i] having a range between 0% and 100% is defined for every nozzle 840 that reduces the original density D[i] 841 of said nozzle 840 to the density 831 Dmin of the nozzle 830 that has the lowest density.

Specifically $NCF[i]=Dmin/D[i]$

The interpretation of a nozzle correction factor is as follows. If a droplet volume V[i] of a nozzle 840 produces too high a density D[i] 841 compared to the density of 831 Dmin of a reference nozzle 830, then multiplying the volume of said droplet by the correction factor NCF[i] would make the density D'[i] of said nozzle 840 equal to the value Dmin of the reference nozzle 830. This is based on the assumption that a linear relationship exists between variations of a droplet volume and the resulting density variations.

Figure 9:
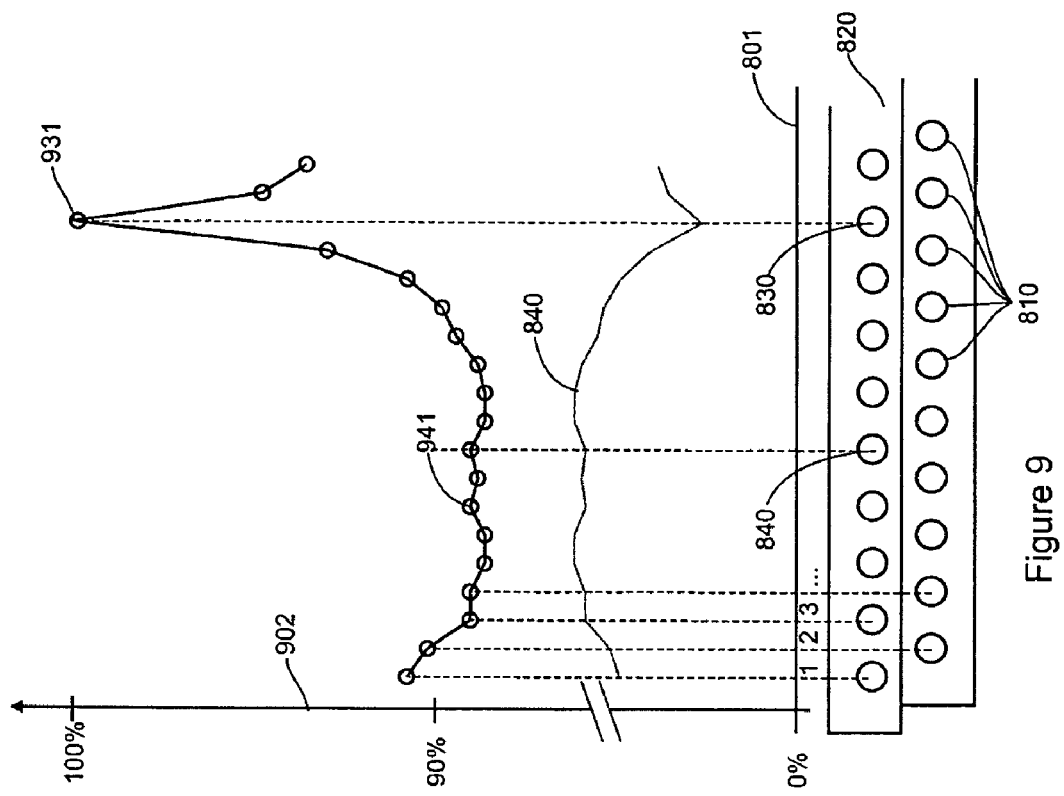
FIG. 9 shows a correction factors corresponding to the printer profile shown in FIG. 8.

FIG. 9 shows the correction factors 941 plotted for the print head 820 shown in FIG. 8. As can be seen, the correction factor 931 is 100% for the reference nozzle 830, and has smaller values 941 for the other nozzles 840.

In a case that density is substantially proportional to droplet volume and that the droplet volume is substantially proportional to the value that drives a print nozzle, the same correction factors can be used for all the printable droplet volumes.

Take, for example, a print head can produce droplets that are nominally {0 pl, 7 pl, 14 pl, 21 pl, 28 pl, 35 pl, 42 pl, 49 pl}. If a profile image was made by using droplets having a volume that is nominally 28 pl, then the nozzle correction factors that are obtained for these nominally 28 pl droplets can also be used for the other droplet volumes.

In a case that the density is not substantially proportional to droplet volume or that droplet volume is not proportional to the value that drives a print nozzle, it may be better to print different profile images using all possible nominal droplet volumes, and to calculate a separate nozzle correction factor for every nominal droplet volume.

Calculation of Look Up Table

According to a preferred embodiment of the current invention, nozzle correction look up tables are created for each nozzle belonging to a print head or a print head assembly based on the correction factors.

The entry of such a look up table is represented with the same number of bits as the number that represents the possible droplet volumes of each nozzle. Every entry value corresponds with a nominal droplet volume.

This number of bits also corresponds with the number of bits of the halftone values that normally drive the print head driver. In one preferred embodiment, the number of bits of an entry of a nozzle compensation look up table is equal to three.

The output of the look-up table is a positive integer number that is represented with substantially more bits than the entry of the table. In the same preferred embodiment, the output of the look up table is an eight-bit word.

The output values of a nozzle compensation look up table corresponding to a nozzle are based on a nozzle correction factor that is calculated in the previous step.

More specifically, the output value for a given look up table entry corresponds with the nozzle correction factor—scaled from zero to the maximum look up table output value—that was calculated for the nominal droplet volume that corresponds with said loop up table entry value.

Figure 10B:
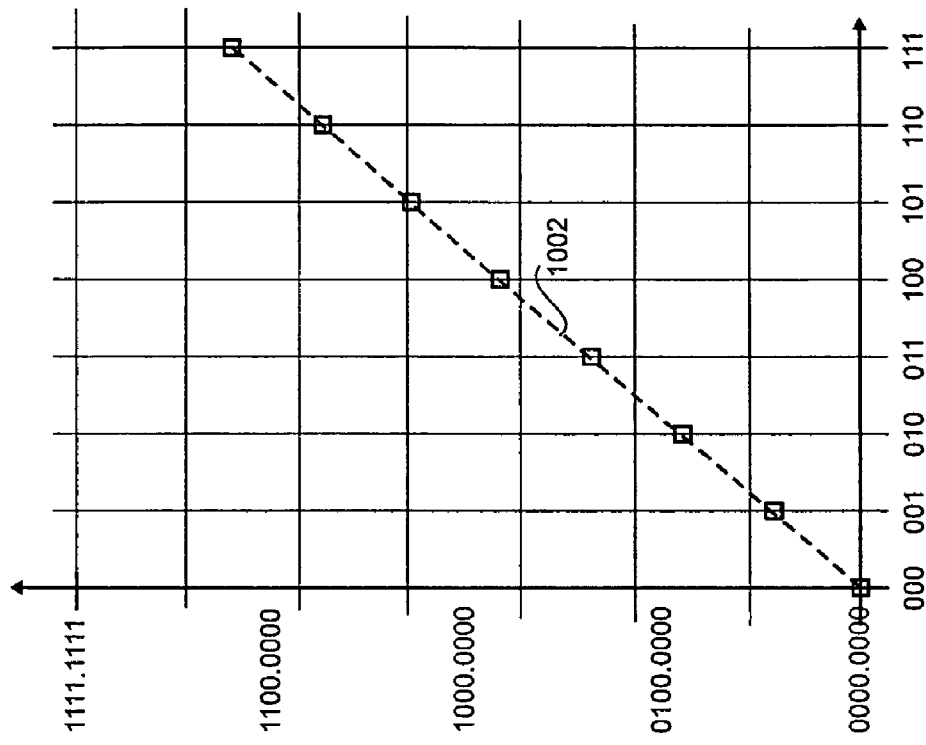
FIG. 10B shows the contents of a look up table for the correction of a nozzle that prints with density that is higher than a minimal density.
Figure 10A:
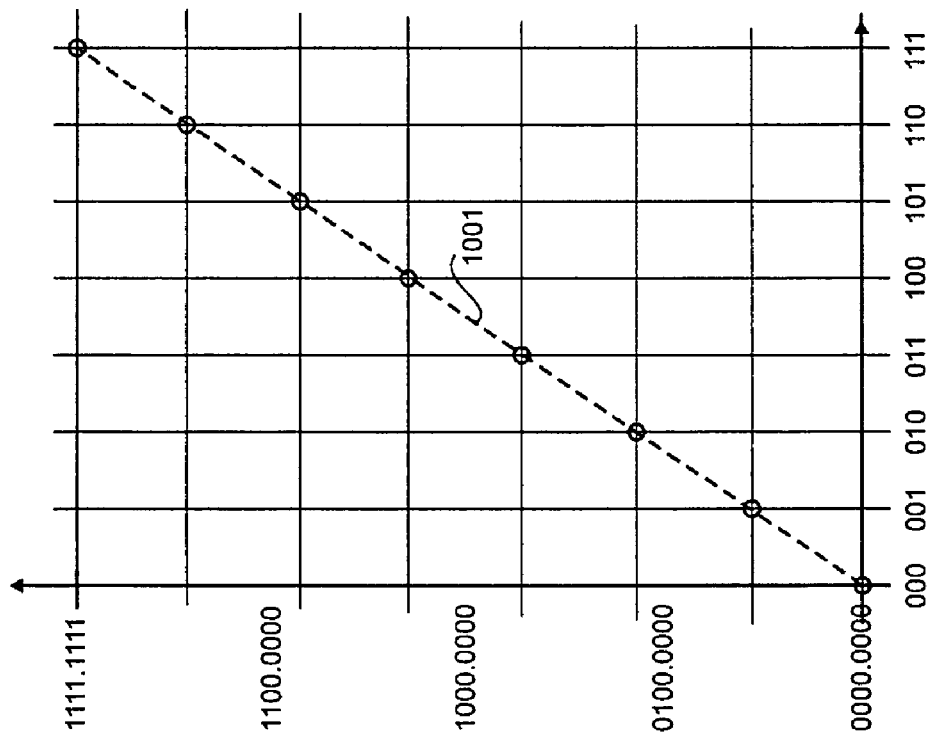
FIG. 10A shows the contents of a look up table for the correction of a nozzle that prints with a minimal density.

FIG. 10A shows an example of a look up table in which the nozzle correction factor is equal to 100% for all the entries of the table. Such a look up table would be representative for a nozzle having an index 830 that prints with the lowest density 831 having a value Dmin.

FIG. 10B shows an example of a look up table in which the nozzle correction factor is equal to 80% for all the entries of the table. Such a look up table would be representative for a nozzle that prints with a density that is 125% of the density of a nozzle with a lowest density Dmin.

Figure 10C:
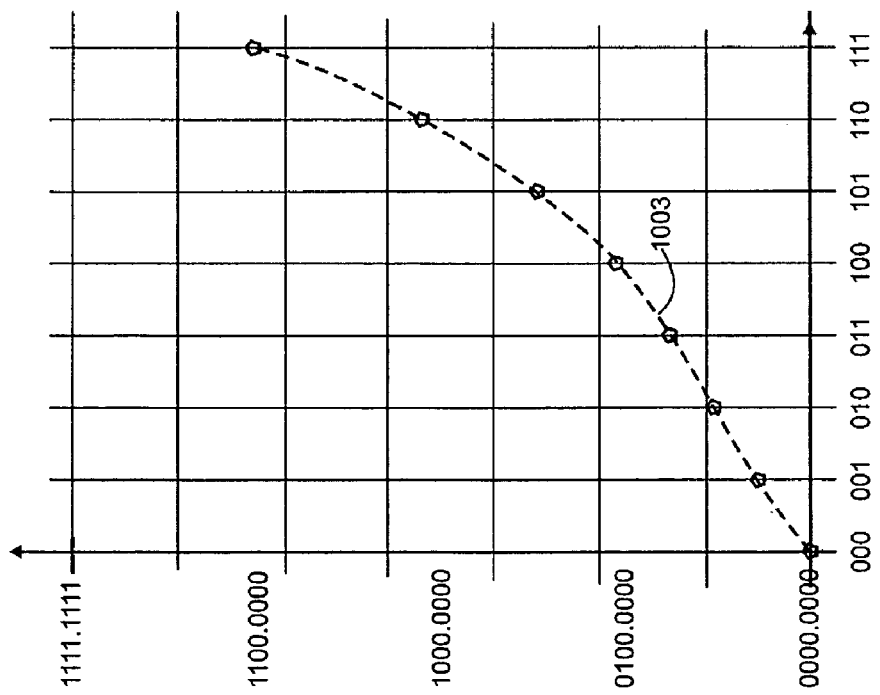
FIG. 10C shows the contents of a look up table for the correction of a nozzle that prints with density that is higher than a minimal density and with a different correction factors for different ink volumes.

FIG. 10C shows an example of a look up table in which the nozzle correction factors are different for all the entries of the table. The different nozzle correction factors that correspond with the different entries can be obtained by printing a profile image for every nominal droplet volume.

Image Processing for Printing an Image

FIG. 11 shows an embodiment of an image-processing scheme that uses a method according to the current invention to print an image.

A document 1110 that is to be printed is typically represented in a resolution independent format such as PDF™, PostScript™ or Microsoft-Word™.

In a first image-processing step, said document 1110 is transformed into raster image 1111 having a same colorant space and same spatial and tone resolution as a printing device. This image-processing step, which is typically performed using raster image processing software that operates on a data processing system 600, comprises several sub-steps.

A first sub-step is converting the objects in the document, such as tinted blocks, fonted text and raster images into a raster image having the same spatial resolution as a device on which the document is to be printed.

A second sub-step involves converting the colors of the objects in said document into the colorant space of a device on which the document is to be printed.

A third sub-step is called digital halftoning and involves reducing the resolution of the amounts of colorants to the colorant resolution of a device on which the document is to be printed in a way that the visibility of image quality artifacts is minimized.

Preferably, the raster image processing is performed using an external data processing system 600. An alternative is a data processing system that is embedded in a printer.

A second image-processing step involves a nozzle correction step 1121. Said nozzle correction step 1121 transforms an uncorrected pixel of a raster image 1111 represented at a first colorant resolution into a nozzle corrected pixel of a raster image 1112 represented at a second colorant resolution, which is higher than said first colorant resolution.

This is preferably achieved by using for every pixel in the image 1111 a nozzle correction look up table that corresponds with the nozzle by which said pixel is printed, and that is obtained using one of the methods that was earlier explained.

A third image-processing step involves a spatial modulation step 1122 in which said nozzle corrected pixels of a raster image 1112 are quantized into quantized pixels of a raster image 1113, and in which said quantization involves a spatial diffusion of the quantization error that is introduced by said quantization process.

In one embodiment, the quantization and spatial diffusion process of the quantization error uses a one dimensional error diffusion process. This embodiment is explained in detail in a next paragraph.

In another embodiment, the quantization and spatial diffusion process of the quantization error uses a pulse width modulation process.

Error Diffusion and Delta-Sigma Modulation

Figure 12:
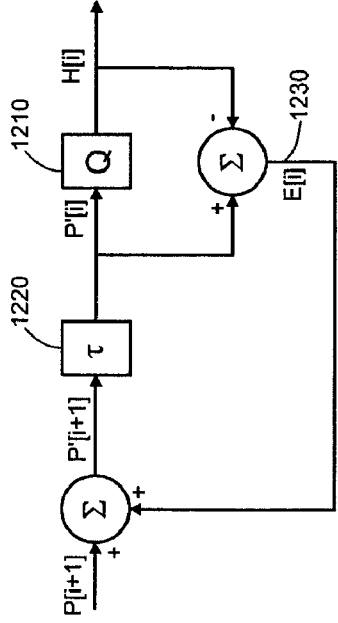
FIG. 12 shows an error diffusion method with one weight.

A one-dimensional error diffusion according to a first embodiment of the current invention is shown in FIG. 12.

In a first step, a modified pixel value P'[i] is quantized by a quantizer 1210 into a halftoned pixel value H[i].

A quantization error value E[1] is calculated by subtracting from the value of modified pixel P'[i] the value of halftoned value H[i].

This error is added to a non-modified pixel value P[i+1], resulting into a modified pixel value P'[i+1].

In a second step the value of the modified pixel P'[i+1] is shifted through a shift register 1220 over one pixel position to obtain a shifted modified pixel value P'[i], and the first step is repeated for i=[2,N] in which N is equal to the number of the image lines of the printed document that is printed by a specific nozzle.

According to a preferred embodiment, the value of the non-modified pixel P[i+1] is represented on a high-resolution tone scale, such as for example a scale represented by 8 bit unsigned integer values. This would mean that a value of P[i+1] would be in the range [0..255].

The value of a halftoned pixel value H[i] is represented on the same tone scale as P[i+1], but is allowed to have only a distinct number of values. For example, in a printing system with a print head that can render only four distinct droplet volumes, the value of H[i] would be restricted to a value from the ordered set {0, 85, 170, 255}.

In one embodiment, the quantization levels are equally spaced. The largest quantization step qStepMax is defined as the largest difference between two subsequent quantization levels in the ordered set. In the above example, the maximum quantization step qStepMax is equal to 85.

The quantizer 1210 selects the value for H[i] that is closest to the value of P'[i]. From this follows that the range of the quantization error E[i] should comprise the interval [−qStepMax/2, qStepMax/2]. In the above example, for example, a value 42 of a modified pixel P'[i] would result in a quantization to 0, and a quantization error of −42. On the other hand, a value 44 of a modified pixel value P'[i] would result in a quantization to 85 and a quantization error E[i] of +43.

The modified pixel value P'[i+1] is the sum of the non-modified pixel P[i+1] and the error E[i] and should be represented on a high resolution tone scale comprising the range [−qStepMax/2, 255+qStepMax/2].

By adding the quantization error E[i] to a non-modified pixel P[i+1], the error diffusion algorithm results in a sequence of pixel values H[i] that on average are equal to the unmodified pixel value P[i+1].

For certain constant values of the non-modified pixel P[i+1], the scheme in FIG. 12 may result in quasi-periodic sequences of the values of the error diffused pixels H[i].

Figure 13:
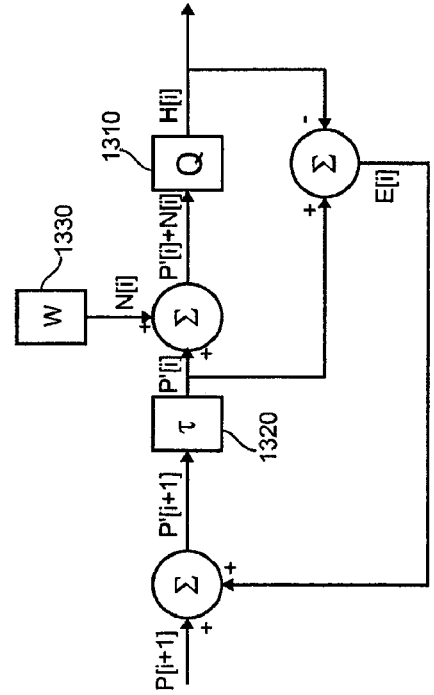
FIG. 13 shows an error diffusion method with one weight and with the addition of noise.

Referring to FIG. 13, these quasi-periodic sequences can be effectively broken up by adding random numbers N[i] to the modified pixel values P'[i]. The random numbers that are used by the spatial modulators of different nozzles are preferably uncorrelated. In one embodiment, the range of random numbers corresponds to one quantization step qStep of the quantizer 1410. In another embodiment, the random numbers N[i] comprise a sequence of numbers that randomly alternate between +/qStep and −qStep.

Figure 14:
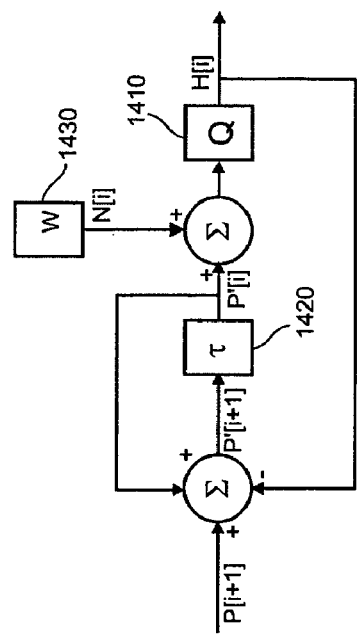
FIG. 14 shows an alternative representation of the scheme shown in FIG. 13.

By combining the addition of the four P[i+1], P'[i], N[i] and H[i] into one addition, the scheme shown in FIG. 13 can be redrawn into the equivalent scheme in FIG. 14. Both schemes operate exactly in the same fashion; the only difference is that the error E[i] is not explicitly calculated in the scheme shown in FIG. 14.

Figure 15:
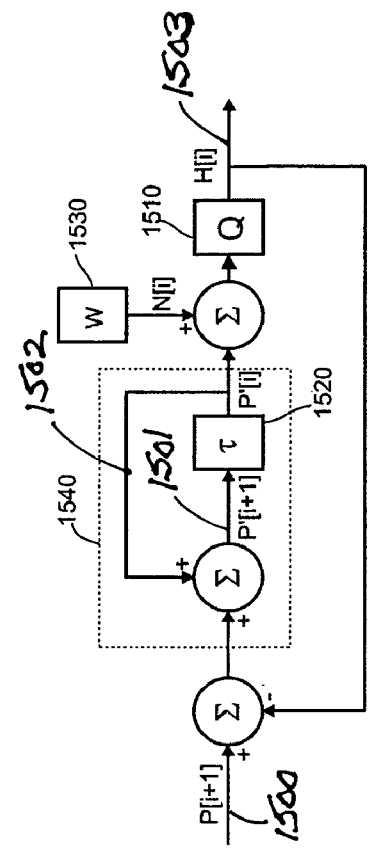
FIG. 15 shows an alternative representation of the scheme shown in FIG. 13 and FIG. 14.

By splitting up the sum of the four additive components in FIG. 14 into a first sum of three and a second sum of two components, the equivalent scheme shown in FIG. 15 is obtained.

The scheme in FIG. 15, which effectively corresponds to the scheme of a delta-sigma modulator, provides a different interpretation of the error diffusion algorithm. The addition of a modified pixel value P'[i] to a next modified pixel value P'[i+1] acts as a first order integrator 1540. By subtracting the output signal H[i] from the input signal P[i] and integrating the result, a feedback chain is realized that guarantees that the average value of the output sequence H[i] follows the average value of the input sequence P[i+1]. The feedback chain also effectively suppresses the effect of the addition of the random numbers N[i]. Because the feedback loop comprises an integrator 1540 that acts like an integrating (low-pass) filter, low frequency components of the random signal N[i] are be relatively more suppressed by the feedback loop, and the spectrum of the random signal N[i] is altered. Therefore, the integrator 1540 is sometimes referred to as a noise-shaping filter.

The scheme in FIG. 15 shows a first order integrator (having only one delay). According to another embodiment, a higher order integrator is used with multiple delays. FIG. 16, for example, show a second order integrator in which a fraction W1 of value of P'[i] is added to P'[i+1] and a fraction W2 of the value of P'[i] is added to P'[i+2]. The effects of the number of delays and of the values of the weights is the subject of digital signal processing as known to the person skilled in the art.

Figure 19:
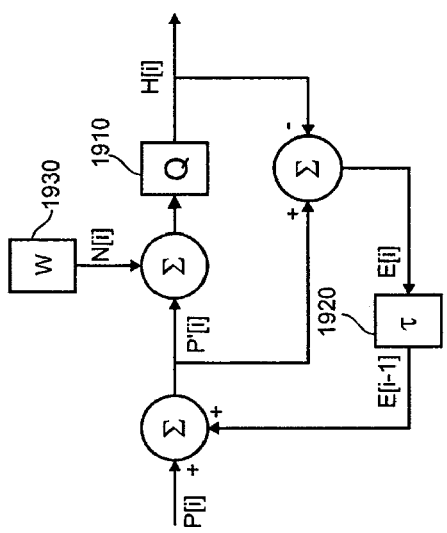
FIG. 19 shows a preferred embodiment according to the current invention.
Figure 22:
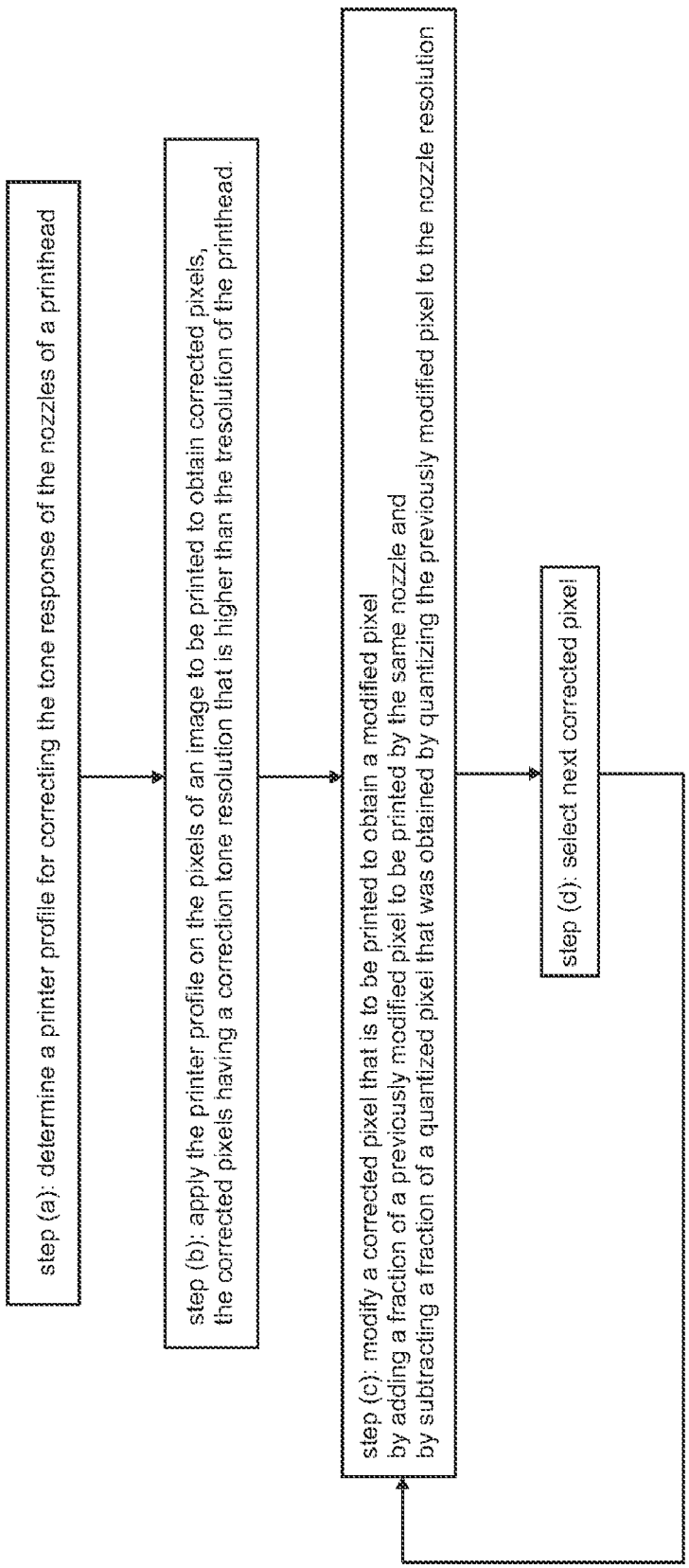
FIG. 22 shows a flowchart including steps (a) through (d) of a method according a preferred embodiment of the present invention.

FIG. 19 shows yet another embodiment of the current invention. In this case an error signal E[i] is calculated based on the difference between a modified pixel value P'[i] and a halftoned pixel H[i]. This error signal E[i] is delayed one pixel position to obtain a delayed error signal E[i−1] and is added to pixel value P[i] to obtain a modified pixel value P'[i].

With reference to FIG. 15, it was found that the addition of random numbers N[i] to the output P'[i] of an integrator 1540 occasionally results in an undesirable value of H[i].

Figure 20:
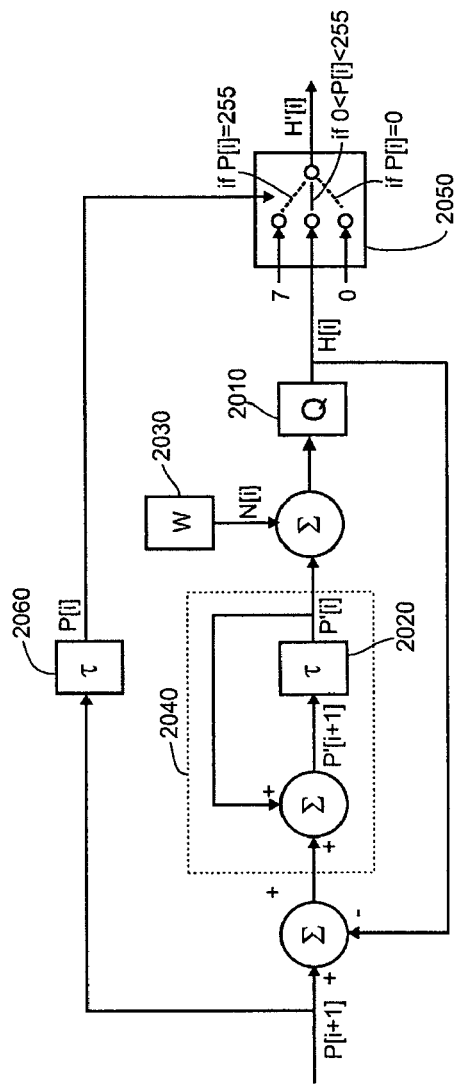
FIG. 20 shows a first embodiment that comprises an overriding mechanism.

In order to improve the above problems, a preferred embodiment shown in FIG. 20 comprises an overriding mechanism 1950. According to said embodiment, the overriding mechanism comprises a switch that can select between an output value H[i] and at least one fixed value as a function of the input value P[i] of a spatial modulator.

Referring to FIG. 20, this overriding mechanism can, for example in case that an input pixel P[i] represents a lightest color having a continuous tone value 0, force the output H'[i] also to render the lightest possible quantized color having a value 0, thus overriding the output H[i] of the spatial modulator.

Referring to FIG. 20, this overriding mechanism can, for example in case that an input pixel P[i] represents a darkest color having a continuous tone value 255, force the output H'[i] also to render the darkest possible quantized color having a value 7, thus overriding the output H[i] of the spatial modulator.

Figure 21:
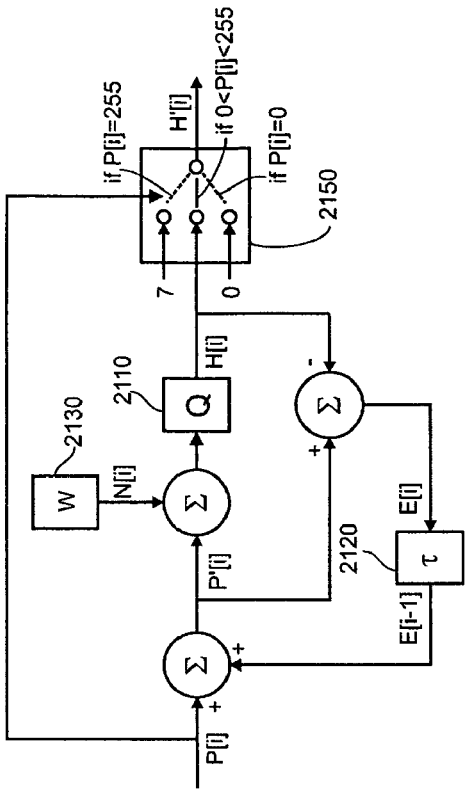
FIG. 21 shows a preferred embodiment that comprises an overriding mechanism.

FIG. 21 shows an embodiment that is based on the embodiment shown in FIG. 19, comprising an overriding mechanism to override an output values H[i] as a function of the input value P[i] of a spatial modulator. Compared to the embodiment shown in FIG. 20, this embodiment has an advantage in that no additional delay is required of the signal P[i] that drives the switch 2150.

Combination of Nozzle Correction and Spatial Modulation in One Step

According to one embodiment, the nozzle correction step and spatial modulation step are combined in one step. Referring to FIG. 17, which is related to FIG. 12, a printer model 1730 is used in the feedback loop of an error diffusion or delta sigma modulation scheme.

The printer model transforms a value H[i] that drives a nozzle i into a value that is representative for the density that is produced by said nozzle, and it is that density value that is used to calculate the quantization error E[i] for feed back.

In one embodiment the printer model is simply a factor that ranges between 0% and 100% and that can differ for each individual nozzle.

Figure 18:
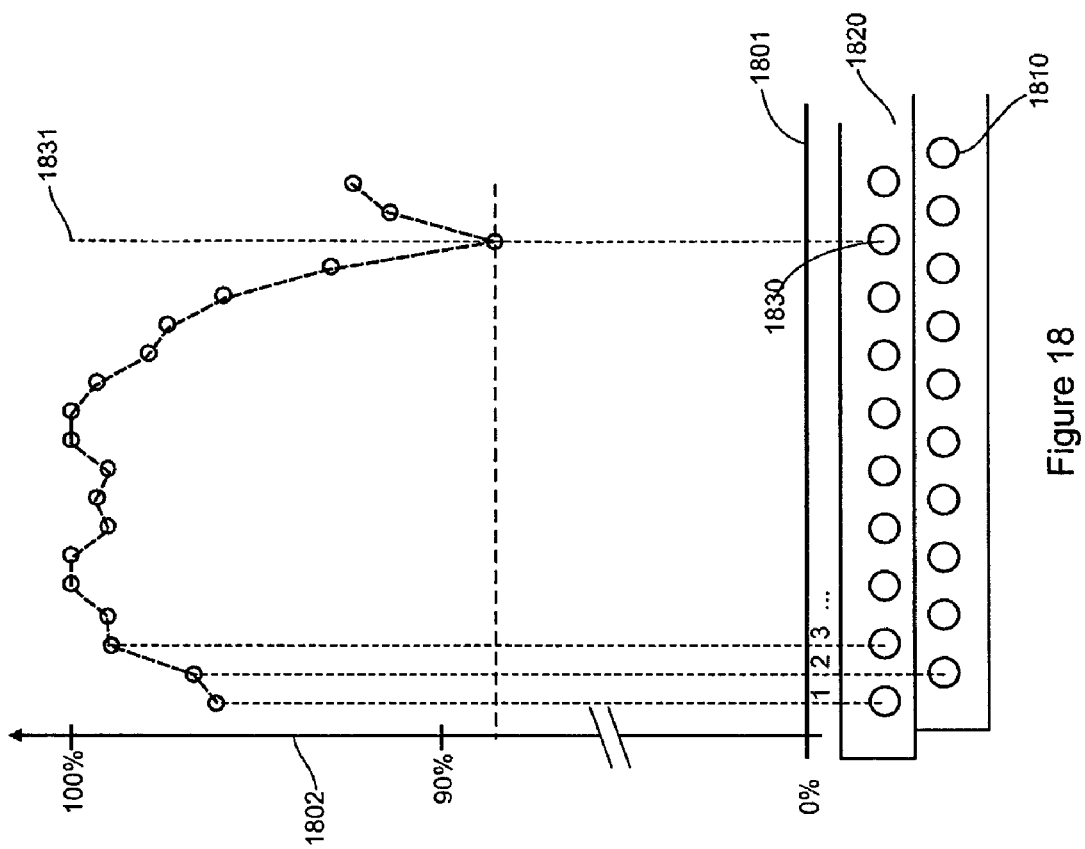
FIG. 18 shows correction factors for different nozzles for use in the printer model shown in FIG. 17.

FIG. 18, for example shows different scale factors for different nozzles of a print head having a profile shown in FIG. 8.

In another embodiment, the printer model is a look up table having an entry that corresponds with the value that drives a nozzle and an output that corresponds with a density produced by said nozzle.

The result of the spatial modulation step 1122 are pixels having values 1113 represented at the same tone resolution as the printer.

Printing Step

After the spatial modulation step 1122, the output values 1113 corresponding with different nozzles are sent to a print driver 1123 that drives the nozzles of print head. This results in a printed image 1115.

The image processing steps 1121 and 1122 can be performed by an external or embedded general purpose data processing system. According to a preferred embodiment, however, they are performed by the same field programmable array. In general this is the same field programmable array that also comprises the print head drivers. In order to reduce memory requirements, the above image processing steps are preferably not performed all at once on the whole image. Preferably the nozzle correction and the spatial modulation are synchronized with driving the print head so that at any time only these pixel values are stored that are needed for driving the print head.

Generalization

While the present invention has been described in connection with preferred embodiments thereof, it will be understood that it is not intended to limit the invention to those embodiments and that numerous modifications can be made therein without departing from the scope of the invention as defined in the appending claims.

For example, in the preferred embodiments sigma delta modulation or error diffusion scheme is presented with one or two weights, but schemes may also be used with more weights.

In the above examples, the quantization error in the error diffusion scheme is transferred only to one or more pixels that are printed by the same nozzle, but in another embodiment said quantization error is at least partially transferred to a pixel that is printed by a different nozzle, for example to a pixel that is printed by a neighboring nozzle.

In the above examples, printing was achieved with a print head assembly that is large enough to print a whole document in one pass. However, the invention can also be advantageously be used in combination with shorter print heads that print a document in different passes.

In the preferred embodiment, error diffusion or delta sigma modulation is used to perform the spatial modulation of the quantization error. An alternative technique of spatial modulation would be to add a periodic or a stochastic signal to the nozzle corrected pixels 1112, and to perform a linear quantization of this sum to obtain values 1113 having the same tonal resolution as a printing device.

The invention claimed is:

1. An image processing method for printing on a printer an image comprising pixels having an image tone resolution, said printer comprising an array of print nozzles, said nozzles having a nozzle tone resolution, the method comprising:
    (a) determining a printer profile for correcting the tone response of said array of nozzles;
    (b) applying said printer profile on the pixels of said image to obtain corrected pixels, said corrected pixels having a correction tone resolution that is higher than said nozzle tone resolution;
    (c) modifying a corrected pixel to be printed by a nozzle to obtain a modified pixel by adding a fraction of a previously modified pixel to be printed by the same nozzle and by subtracting a fraction of a quantized pixel that was obtained by quantizing said previously modified pixel to said nozzle resolution; and
    (d) repeating step (c) for a next corrected pixel.

2. The method according to claim 1, additionally comprising the step of:
    adding a random number to said previously modified pixel.

3. The method according to claim 1, additionally comprising the step of:
    printing said quantized pixel using said printer.

4. The method according to claim 1, additionally comprising the step of:
    overriding the value of the quantized pixel by a first preset value if the corresponding corrected pixel of the image is equal to a second value.

5. The method according to claim 1, further comprising the step of:
    printing said quantized pixels using said printer.

6. A controller for a dot matrix printer, said printer having an array of nozzles operating at a nozzle tone resolution, said controller comprising:
    means for storing pixels of a raster image, said pixels represented at an image tone resolution;
    means for storing a printer profile for correcting a tone response of said array of nozzles;
    means for tone correcting the pixels of said raster image using said printer profile to obtain nozzle corrected pixels represented at a correction tone resolution which is higher than said nozzle tone resolution;
    means for modifying a corrected pixel to be printed by a nozzle by adding a fraction of previously modified pixel to be printed by the same nozzle and by subtracting a fraction of a quantized pixel that was obtained by quantizing said previously modified pixel to said nozzle resolution; and
    means for quantizing said previously modified pixel in order to obtain a quantized pixel, said quantized pixel represented at said nozzle tone resolution.

7. The controller according to claim 6, wherein said means for modifying and quantizing are implemented on a field programmable array.

8. A printer comprising:
    an array of nozzles operating at a nozzle tone resolution; and
    a controller, said controller comprising:
    means for storing pixels of a raster image, said pixels represented at an image tone resolution;
    means for storing a printer profile for correcting a tone response of said array of nozzles;
    means for tone correcting the pixels of said raster image using said printer profile to obtain nozzle corrected pixels represented at a correction tone resolution which is higher than said nozzle tone resolution;
    means for modifying a corrected pixel to be printed by a nozzle by adding a fraction of previously modified pixel to be printed by the same nozzle and by subtracting a fraction of a quantized pixel that was obtained by quantizing said previously modified pixel to said nozzle resolution; and
    means for quantizing said previously modified pixel in order to obtain a quantized pixel, said quantized pixel represented at said nozzle tone resolution.

9. A non-transitory computer readable medium comprising computer code to perform an image processing method for printing on a printer an image comprising pixels having an image tone resolution, said printer comprising an array of print nozzles, said nozzles having a nozzle tone resolution, the method comprising the steps of:
    (a) determining a printer profile for correcting a tone response of said array of print nozzles;
    (b) applying said printer profile on the pixels of said image to obtain corrected pixels, said corrected pixels having a correction tone resolution that is higher than said nozzle tone resolution;
    (c) modifying a corrected pixel to be printed by a nozzle to obtain a modified pixel by adding a fraction of a previously modified pixel to be printed by the same nozzle and by subtracting a fraction of a value of a quantized pixel that was obtained by quantizing said previously modified pixel to said nozzle resolution; and
    (d) repeating step (c) for a next corrected pixel.

* * * * *